United States Patent
Pershikova et al.

(10) Patent No.: US 8,535,437 B2
(45) Date of Patent: *Sep. 17, 2013

(54) PUMPABLE GEOPOLYMERS COMPRISING A FLUID-LOSS AGENT

(75) Inventors: Elena Pershikova, Paris (FR); Olivier Porcherie, Paris (FR); Slaheddine Kefi, Velizy Villacoublay (FR); Yamina Boubeguira, Les Moulineaux (FR); Hafida Achtal, Argenteuil (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/511,640

(22) PCT Filed: Nov. 10, 2010

(86) PCT No.: PCT/EP2010/006957
§ 371 (c)(1),
(2), (4) Date: Jul. 3, 2012

(87) PCT Pub. No.: WO2011/072785
PCT Pub. Date: Jun. 23, 2011

(65) Prior Publication Data
US 2012/0260829 A1    Oct. 18, 2012

(30) Foreign Application Priority Data
Dec. 17, 2009 (EP) .................................. 09179721

(51) Int. Cl.
*C04B 24/10* (2006.01)

(52) U.S. Cl.
USPC ............................ 106/729; 106/730; 166/293

(58) Field of Classification Search
USPC ................................. 106/729, 730; 166/293
See application file for complete search history.

(56) References Cited

U.S. PATENT DOCUMENTS

| | | |
|---|---|---|
| 4,509,985 A | 4/1985 | Davidovits et al. |
| 4,859,367 A | 8/1989 | Davidovits |
| 5,339,903 A | 8/1994 | Eoff et al. |
| 5,349,118 A | 9/1994 | Davidovits |
| 5,356,579 A | 10/1994 | Jennings et al. |
| 5,539,140 A | 7/1996 | Davidovits |
| 5,626,665 A | 5/1997 | Barger et al. |
| 5,635,292 A | 6/1997 | Jennings et al. |
| 5,637,412 A | 6/1997 | Jennings et al. |
| 5,788,762 A | 8/1998 | Barger et al. |
| 2007/0015678 A1 | 1/2007 | Rodrigues et al. |
| 2007/0102160 A1 | 5/2007 | Jones et al. |
| 2008/0028994 A1 | 2/2008 | Barlet-Gouedard et al. |
| 2012/0267106 A1* | 10/2012 | Pershikova et al. ........... 166/285 |

FOREIGN PATENT DOCUMENTS

| | | |
|---|---|---|
| EP | 1887065 | 11/2010 |
| WO | 2005/019130 | 3/2005 |
| WO | 2008/017413 | 2/2008 |
| WO | 2008/017414 | 2/2008 |

OTHER PUBLICATIONS

"Synthesis of new high-temperature geo-polymers for reinforced plastics/composites", SPE PACTEC' 79, Society of Plastics Engineers.
G. Daccord, B. Craster, H. Ladva, T.G.J. Jones, G. Manescu, "Cement-FormationInteractions," Well Cementing, Second Edition by E. Nelson and D. Guillot, 2006, pp. 191-232.

* cited by examiner

Primary Examiner — Paul Marcantoni
(74) Attorney, Agent, or Firm — Michael Dae

(57) ABSTRACT

The invention concerns the use of a fluid loss control additive in a pumpable geopolymeric suspension for oil and/or gas industry applications, said suspension further comprising an aluminosilicate source, a carrier fluid, and an activator, and method of providing such a suspension in a borehole. In particular, the suspension according to the invention is used for well primary cementing operations and/or remedial applications.

20 Claims, No Drawings

PUMPABLE GEOPOLYMERS COMPRISING A FLUID-LOSS AGENT

FIELD OF THE INVENTION

The present invention relates to pumpable geopolymer formulations or suspensions, and their uses in oil and/or gas industry applications.

DESCRIPTION OF THE PRIOR ART

Geopolymers are a novel class of materials that are formed by chemical dissolution and subsequent recondensation of various aluminosilicate oxides and silicates to form an amorphous three-dimensional framework structure. The term geopolymer was proposed and first used by J. Davidovits (Synthesis of new high-temperature gee-polymers for reinforced plastics/composites, SPE PACTEC' 79, Society of Plastics Engineers) in 1976 at the IUPAC International Symposium on Macromolecules held in Stockholm. Other terms have been used to describe materials synthesized utilizing a similar chemistry, such as alkali-activated cement, geocement, alkali-bonded ceramic, inorganic polymer, hydroceramic. In the following description, the term geopolymer will be used.

Geopolymers based on alumino-silicates are generally designated as poly(sialate), which is an abbreviation for poly (silicon-oxo-aluminate) or $(-Si-O-Al-O-)_n$ (with n being the degree of polymerization). The sialate network consists of $SiO_4$ and $AlO_4$ tetrahedra linked alternately by sharing all the oxygens, with $Al^{3+}$ and $Si^{4+}$ in IV-fold coordination with oxygen. Positive ions ($Na^+, K^+, Li^+, Ca^{2+}, \ldots$) must be present in the framework cavities to balance the charge of $Al^{3+}$ in IV-fold coordination.

The empirical formula of polysialates is: $M_n \{-(SiO_2)_z-AlO_2\}_n$, w $H_2O$, wherein M is a cation such as potassium, sodium or calcium, n is a degree of polymerization and z is the atomic ratio Si/Al which may be 1, 2, 3 or more, until 35 as known today.

The three-dimensional network (3D) geopolymers are summarized in the table below.

TABLE 1

Geopolymers chemical designation (wherein M is a cation such as potassium, sodium or calcium, and n is a degree of polymerization)

| Si/Al ratio | Designation | Structure | Abbreviations |
|---|---|---|---|
| 1 | Poly(sialate) | $M_n(-Si-O-Al-O-)_n$ | (M)-PS |
| 2 | Poly(sialate-siloxo) | $M_n(-Si-O-Al-O-Si-O)_n$ | (M)-PSS |
| 3 | Poly(sialate-disiloxo) | $M_n(-Si-O-Al-O-Si-O-Si-O-)_n$ | (M)-PSDS |

The properties and application fields of geopolymers will depend principally on their chemical structure, and more particularly on the atomic ratio of silicon versus aluminum. Geopolymers have been investigated for use in a number of applications, including as cementing systems within the construction industry, as refractory materials, as coatings, as ceramic precursors and as encapsulants for hazardous and radioactive waste streams. Geopolymers are also referenced as rapid setting and hardening materials. Compared to conventional Portland cement, they typically exhibit superior hardness and chemical stability.

First step of geopolymer synthesis involves the suspension of solid raw materials, such as the above mentioned alumino-silicates, into a carrier fluid. The fluid-to-solid ratio of this suspension affects properties of the suspension, such as for example, its viscosity and hardening time, and the properties of the hardened material obtained from the same suspension. Adjustment of the viscosity of this geopolymeric suspension without altering the other properties is critical in many applications such as the homogeneous coating thickness, the molding of ceramics pieces or the placement of the cement in building structure or in well cementing.

Well cementing, in particular, implies the control of the viscosity of the suspension at various temperatures encountered by the fluid in order to achieve a good placement of the fluid, while the fluid-to-solid ratio affects other critical parameters of well cementing operation such as for example the density of the suspension, the permeability and the mechanical properties of the hardened material.

Different prior art documents disclose the use of geopolymer compositions in the construction industry. In particular U.S. Pat. No. 4,509,985 discloses a mineral polymer composition employed for the making of cast or molded products at room temperatures, or temperatures generally up to 120° C.; U.S. Pat. Nos. 4,859,367, 5,349,118 and 5,539,140 disclose a geopolymer for solidifying and storing waste material in order to provide the waste material with a high stability over a very long time, comparable to certain archeological materials, those waste materials can be dangerous and even potentially toxic for human beings and the natural environment; U.S. Pat. Nos. 5,356,579, 5,788,762, 5,626,665, 5,635,292 5,637,412, and 5,788,762 disclose cementitious systems with enhanced compressive strengths or low density for construction applications. WO2005019130 highlights the problem of controlling the setting time of the geopolymer system in the construction industry.

More recently WO2008017414 A1 and WO2008017413 A1, describe application of the geopolymers for the oilfield industry. These documents state that, besides rapid strength development required in construction application, it is important that geopolymers for the oilfield application have control of the thickening and setting times for large temperature and density ranges for the geopolymer slurry, the mixability and also the pumpabilty of such slurries.

Fluid loss control is another important placement property of the suspensions (slurries) used in oilfield application. During slurry placement into the wellbore under pressure, fluid loss occurs; this phenomenon implies an increase of the slurry density with the diversion of the slurry performance from the initial job design. If sufficient fluid is lost into the formation, it may be responsible for primary cementing failures owing to excessive increases in slurry viscosity during placement, annular bridging, or accelerated pressure declines during the waiting-on-cement period [*Well Cementing, Second Edition* by E. Nelson and D. Guillot, 2006, 773 p. 192], that is why, in the cementing practice so called fluid loss control agents are employed to retain the liquid phase in the pumped systems.

When slurry is placed downhole, short thickening and setting time are preferred to accelerate the strength development of geopolymer composition.

Therefore, it is desirable to produce geopolymers having fluid loss control ability while still retaining good properties for oilfield applications. WO2008017414 A1 and WO2008017413 A1 mention that fluid loss control additives (FLAC), such as latex or pigments or polymer microgels, can be added into geopolymer compositions.

SUMMARY OF THE INVENTION

One of the goals is to propose a mixable and pumpable geopolymeric stable suspension that is usable in the oilfield industry.

The suspension comprises an aluminosilicate source, a carrier fluid, an activator, and a fluid loss control additive comprising at least a carbohydrate-based compound.

Thus, in a first aspect, embodiments concern methods involving a carbohydrate-based compound as a fluid loss control additive in a pumpable geopolymeric suspension for oil and/or gas industry applications, said suspension further comprising an aluminosilicate source, a carrier fluid, and an activator.

Preferably, the aluminosilicate source is selected from the group consisting of: clays, dehydrated clays, dehydrated kaolins (metakaolin), fly ashes, blast-furnace slags, natural and synthetic zeolites, feldspars, dehydrated feldspars, alumina and silica sols, aluminum silicate or silica ceramic products (refractories, wares, catalytic supports, bricks, structural ceramics), and mixtures thereof. In another embodiment, the aluminosilicate component comprises a first aluminosilicate binder and optionally one or more secondary binder components which may be chosen from the list: ground granulated blast furnace slag, fly ash, Portland cement, kaolin, metakaolin, silica fume, bauxite, alumina oxide and hydroxide. For example, the aluminosilicate is ASTM fly ash class C or fly ash type Preferably, the carrier fluid is selected from the group consisting of fresh water, sea water, brines, re-cycled water or recuperated water, and mixtures thereof.

Preferably, the activator is a silicate, a metal aluminate, a alkali-metal hydroxide, ammonium hydroxide, a alkaline earth metal hydroxide, sodium carbonate or a mixture thereof. More preferably, the alkaline-metal is selected from the group consisting of lithium, sodium, potassium, rubidium and cesium. More preferably, alkaline-metal is selected from the group consisting of sodium and potassium. In an embodiment, the activator is an ammonia containing compound.

In embodiments, the carbohydrate-based compound is selected from the group consisting of water-soluble polysaccharides and their derivatives. Preferably, the carbohydrate-based compound is selected from the group consisting of starches, water soluble simple cellulose ethers and water soluble mixed cellulose ethers. More preferably, the carbohydrate-based compound is selected from the group consisting of simple cellulose ethers and mixed cellulose ethers. More preferably, the carbohydrate-based compound is a simple cellulose ether. More preferably, the carbohydrate-based compound is selected from the group consisting of carboxymethylcellulose and ethylcellulose.

In preferred embodiments, the carbohydrate-based compound may be starches or carboxymethylcellulose and mixtures thereof.

The carbohydrate-based compound is advantageously efficient in the range of 4° C. to 60° C. The carbohydrate-based compound is preferably efficient in the range of 20° C. to 40° C.

For example, the concentration of the carbohydrate-based compound is comprised between 0.5 g/L and 25 g/L of the total volume of the carrier fluid.

For example, the fluid carrier is selected from the group constituted of: fresh water, sea water, brines, re-cycled water and recuperated water.

In a further aspect, Embodiments concern methods of providing such a suspension, comprising a first step consisting in pre-hydrating the fluid loss control additive in the carrier fluid and a second step consisting in adding the activator and the aluminosilicate source.

In a further aspect, embodiments concern methods of providing such a suspension, comprising a first step consisting in dry-blending the fluid loss control additive, the activator and the aluminosilicate source to make a blend and a second step consisting in adding the blend into the carrier fluid.

The suspension is advantageously a pumpable composition in oilfield industry and the suspension is able to set under well downhole conditions. The suspension is preferably used for cementing operations and/or remedial applications in subterranean wells.

DETAILED DESCRIPTION OF THE INVENTION

Embodiments provide compositions of a pumpable alkali-activate geopolymer suspension for oilfield application comprising one or several aluminosilicate components activated in an alkaline media and at least one component being a carbohydrate compound, preferably belonging to the group of the polysaccharide or their derivatives, to provide the fluid-loss control of cement slurries during placement into the wellbore. The invention provides also related methods of placing such formulations in a well, using conventional or unconventional cementing techniques.

Aluminosilicate component is selected from but not limited to at least one of the following compounds: clays, dehydrated clays, dehydrated kaolins (metakaolin), fly ashes, blast-furnace slags, natural and synthetic zeolites, feldspars, dehydrated feldspars, alumina and silica sols, aluminum silicate and silica ceramic products (refractories, wares, catalytic supports, bricks, structural ceramics), or a mixture thereof. More preferably, aluminosilicate source is ASTM fly ash class C or type F. In an embodiment, the aluminosilicate component comprises a first aluminosilicate binder and optionally one or more secondary binder components which may be chosen in the list: ground granulated blast furnace slag, fly ash, Portland cement, kaolin, metakaolin, silica fume, bauxite, alumina oxide and hydroxide.

Alkali-containing components also referred to as activators are preferably, alkali-metal silicate, aluminate, carbonate, alkali-metal or alkaline-earth metal hydroxide or the mixture thereof. The alkali-metal is selected from the group constituted of lithium, sodium, potassium, rubidium and cesium. Preferably, the metal is sodium or potassium. In another embodiment, the alkaline containing silicate can be substituted by an ammonia containing silicate.

The geopolymeric composition uses as the carrier fluid preferably an aqueous solution such as fresh water. In further embodiment, fresh water may be substituted by the sea water, brines or re-cycled or recuperated water.

The fluid loss control additive (or FLAC), which is used, is a carbohydrate compound selected from the group of the water-soluble polysaccharides and their derivatives, preferably from the group of starches or water soluble cellulose ether. Concentration of at least one polysaccharide or/and their derivatives is preferably between 0.5 g/L and 25 g/L of the total volume of the carrier fluid contained in the geopolymer system. Further, it is preferred that the polysaccharide or/and their derivatives is selected from the group of the cellulose ethers. Preferably, the water soluble cellulose ether is simple ether. More preferably, it is carboxymethylcellulose or ethylcellulose. The fluid loss is preferably efficient in the range of 4° C. to 60° C., more preferably in the range of 20° C. to 40° C.

Mixing of the components of the geopolymers into a slurry can be done in different orders. Fluid loss control additive can be pre-hydrated in the aqueous phase and then solid components can be added. Or, fluid loss control additive can be dry-blended with the solid components and added simultaneously into the aqueous phase. Aqueous phase can comprise at least one of the following components: water, brine, activator. In all the cases, the fluid loss control additive is soluble in the aqueous phase.

In addition, the geopolymer suspension may contain typical cement additives used to control other properties of the suspension, such as weighing agent, dispersants, retarders, and so on.

The viscosity of the suspension is preferably lesser than or equal to 300 cP, more preferably, lesser than or equal to 250 cP, more preferably lesser than or equal to 200 cP.

The API fluid loss of the said suspension is preferably less than 200 ml, more preferably lesser or equal to 100 ml.

Preferably, the step of pumping the suspension of said geopolymeric composition is achieved by using conventional well cementing equipment, familiar to those skilled in the art. The method particularly applies as a primary cementing technique for cementing wells where the geopolymeric composition is pumped down a pipe until the shoe where it then flows up the annular space between the casing/liner and the borehole. A reverse circulation cementing technique may also be used for placing the geopolymer suspension at the desired depth in the borehole.

Further, the pumping and placement of the geopolymer suspension below surface encompasses several other conventional cementing techniques such as the grouting of platform piles, skirts or the like, the squeeze operation for repair or plugging of an undesired leak, perforation, formation or the like, and the setting of a geopolymer composition plug for any purpose of a cement plug. The methods also apply to the placement of the geopolymeric composition to squeeze a zone of the borehole. The methods may apply for water well, geothermal well, steam injection well, Toe to Heel Air Injection well or acid gas well. As such, the composition can withstand temperature above 250° C., even above 450° C. and 550° C.

Finally, embodiments provide a pumpable alkali-activate cement composition for oilfield application comprising aluminosilicate component(s) activated with alkali-containing component and at least one component being a carbohydrate compound belonging to the group of the water-soluble polysaccharide or their derivatives to provide the fluid-loss control of cement slurries during placement into the wellbore and related methods of placing such formulation in a well using conventional or unconventional cementing techniques.

In the following description, all the slurries were mixed and conditioned according to the ISO 10426-2 procedure, the fluid loss values were measured according to API-ISO 5167-3:2003 (ICS:17.120.10) and the thickening times were measured in the pressurized consistometer according to the API-ISO 10426-2:2005.

EXAMPLE 1

This example demonstrates the possibility to control fluid loss with geopolymers containing water soluble cellulose derivatives. Table presents the data for the geopolymer suspensions modified with the different types of water-soluble cellulose ethers at 40° C.

Sample A1 was made by the prehydration of 6.5 g of low viscosity carboxymethylcellulose available from SIGMA Aldrich™ in 235 g of water and subsequent addition of 161.3 g of 10 M solution of sodium hydroxide and the blend comprising 569 g of Fly ash class C, 53.5 g of sodium disilicate.

Sample A2 was made by the prehydration of 3.3 g of medium viscosity carboxymethylcellulose available from SIGMA Aldrich™ in 235 g of water and subsequent addition of 161.3 g of 10 M solution of sodium hydroxide and the blend comprising 569 g of Fly ash class C, 53.5 g of sodium disilicate.

Sample A3 was made by the prehydration of 6.5 g of ethylcellulose available from SIGMA Aldrich™ in 235 g of water and subsequent addition of 161.3 g of 10 M solution of sodium hydroxide and the blend comprising 569 g of Fly ash class C, 53.5 g of sodium disilicate.

It is generally recognized in the art that a compound having a fluid loss value below 100 ml (API) is efficient.

TABLE 2

Fluid loss control properties of the cellulose derivatives at 40 deg C.

| Sample | A1 | A2 | A3 |
|---|---|---|---|
| FLAC composition | Low viscosity Carboxymethyl-cellulose | Medium viscosity Carboxymethyl-cellulose | Ethylcellulose |
| Fluid loss (ml API) | 54 | 22 | 34 |

It was noticed during the experiment that some solid particles penetrated though the standard screen and went into the collected solution. Therefore, it was suggested to use Baroid filter paper to avoid the loss of the solid particles though the standard API screen. In order to demonstrate that the fluid loss control is not induced by the use of a Baroid filter paper, the fluid loss control experiment was conducted for sample A2 at 40° C. with and without using the filter paper (Table 3, examples A2-1 and A2-2 respectively). It shows that fluid loss control exists in both cases and the filter paper determines only the value of the fluid loss.

TABLE 3

Fluid loss control properties of the sample with and without Baroid filter paper used in the experiment at 40° C.

| Sample | A2-1 | A2-2 |
|---|---|---|
| Baroid filter paper | Yes | No |
| Fluid loss, ml API | 22 | 94 |
| Filtercake thickness, mm | 2 | 12 |

EXAMPLE 2

This example demonstrates the possibility to control the fluid loss properties of the geopolymer suspensions by addition of starch. The test is performed with Baroid filter paper. Table 4 presents the effect which was obtained.

Sample B1 was made by the subsequent addition of 167 g of 10 M solution of sodium hydroxide and the blend comprising 569 g of Fly ash class C, 53.5 g of sodium disilicate into 235 g of water:

Sample B2 was made by the prehydration of 4.8 g of modified starch Flotrol available from Ml-SWACO™ in 235 g of water and subsequent addition of 161.3 g of 10 M solution of sodium hydroxide and the blend comprising 569 g of Fly ash class C, 53.5 g of sodium disilicate Sample B3 was made by the subsequent addition of 290.5 g of, 10 M solution of sodium hydroxide and the blend comprising 483 g of Fly ash class F, 96.5 g of sodium disilicate into 117 g of water Sample B4 was made by the prehydration of 6.1 g of modified starch Flotrol available from Ml-SWACO™ in 117 g of water and subsequent addition of 290.5 g of 10 M solution of sodium hydroxide and the blend comprising 483 g of Fly ash class F, 96.5 g of sodium disilicate

TABLE 4

| Fluid loss control property of starch at 40° C. | | | | |
|---|---|---|---|---|
| Sample | B1 | B2 | B3 | B4 |
| Fluid loss (ml API) | 339 | 9 | 486 | 8 |

The invention claimed is:

1. A method of using a carbohydrate containing compound as a fluid loss control additive in a pumpable geopolymeric suspension for oil or gas industry applications or both, said suspension further comprising an aluminosilicate source, a carrier fluid, and an activator.

2. The method according to claim 1, wherein the aluminosilicate source is selected from the group consisting of clays, dehydrated clays, dehydrated kaolins, fly ashes, blast-furnace slags, natural and synthetic zeolites, feldspars, dehydrated feldspars, alumina and silica sols, aluminum silicate or silica ceramic products, and mixtures thereof.

3. The method of claim 2, wherein the aluminosilicate source is ASTM fly ash class C or fly ash class F.

4. The method of claim 1, wherein the carrier fluid is selected from the group consisting of fresh water, sea water, brines, re-cycled water or recuperated water, and mixtures thereof.

5. The method of claim 1, wherein the activator is an alkaline agent.

6. The method according to claim 5, wherein the activator is a silicate, a metal aluminate, an alkali-metal hydroxide, ammonium hydroxide, an alkaline earth metal hydroxide, or sodium carbonate and mixtures thereof.

7. The method of claim 1, wherein the activator is an ammonia containing compound.

8. The method of claim 1, wherein the carbohydrate containing compound is selected from the group consisting of water-soluble polysaccharides.

9. The method of claim 8, wherein the carbohydrate containing compound is selected from the group consisting of starches, water soluble simple cellulose ethers and water soluble mixed cellulose ethers.

10. The method of claim 1, wherein the carbohydrate containing compound is efficient in the range of 4° C. to 60° C.

11. The method of claim 1, wherein the concentration of the carbohydrate containing compound is comprised between 0.5 g/L and 25 g/L of the total volume of the carrier fluid.

12. The method of claim 1, wherein the suspension is pumped downhole in a oil well, a gas well or both, and sets under downhole conditions.

13. The method according to claim 12, wherein the suspension is used for primary cementing operations, remedial applications or both.

14. The method according to claim 1 wherein the carbohydrate containing compound comprises starches or carboxymethylcellulose and mixtures thereof.

15. A method of providing a pumpable geopolymeric suspension comprising an aluminosilicate source, a carrier fluid, an activator and a carbohydrate containing compound as a fluid loss control additive, the method comprising a first step consisting of hydrating the fluid loss control additive in the carrier fluid and a second step consisting of adding the activator and the aluminosilicate source.

16. A method of providing a pumpable geopolymeric suspension comprising an aluminosilicate source, a carrier fluid, an activator and a carbohydrate containing compound as a fluid loss control additive, wherein the method comprises a first step consisting of dry-blending the fluid loss control additive, the activator and the aluminosilicate source to make a blend and a second step consisting of adding the blend into the carrier fluid.

17. The method of claim 15, wherein the activator is an alkaline agent.

18. The method of claim 16, wherein the activator is an alkaline agent.

19. The method of claim 15, wherein the concentration of the carbohydrate containing compound is comprised between 0.5 g/L and 25 g/L of the total volume of the carrier fluid.

20. The method of claim 16, wherein the concentration of the carbohydrate containing compound is comprised between 0.5 g/L and 25 g/L of the total volume of the carrier fluid.

* * * * *